United States Patent [19]

Satoh

[11] Patent Number: 5,432,721
[45] Date of Patent: Jul. 11, 1995

[54] DEVICE AND METHOD OF DISPLAYING MATHEMATICAL EXPRESSION FOR SMALL ELECTRONIC APPLIANCE

[75] Inventor: Akiyoshi Satoh, Nara, Japan

[73] Assignee: Sharp Kabushiki Kaisha, Osaka, Japan

[21] Appl. No.: 174,245

[22] Filed: Dec. 28, 1993

[30] Foreign Application Priority Data

Dec. 28, 1992 [JP] Japan ................... 4-348061

[51] Int. Cl.⁶ ............................... G06F 3/00
[52] U.S. Cl. .................. 364/710.08; 364/710.1
[58] Field of Search ............ 364/710.14, 710.08, 364/709.12, 710.1

[56] References Cited

U.S. PATENT DOCUMENTS

| | | | |
|---|---|---|---|
| 4,386,412 | 5/1983 | Ito | 364/710.14 |
| 4,935,889 | 6/1990 | Harada et al. | 364/710.14 |
| 5,067,102 | 11/1991 | Eisenstein | 364/709.12 |
| 5,132,924 | 7/1992 | Kawawaki et al. | 364/710.08 |
| 5,189,633 | 2/1993 | Bonadio | 364/709.12 |

Primary Examiner—Tan V. Mai

[57] ABSTRACT

When a user requested mathematical expression requiring, when normally displayed, a plurality of display rows is not an independent numerical element in another mathematical expression, for example, a numerator portion, the requested mathematical expression is displayed in a each textbook representation format with element of the mathematical expression positioned in a fixed manner on a predetermined display row. When a second mathematical expression is determined to be an independent numerical element in a first mathematical expression displayed in the textbook format, the independent numerical element is displayed in a one row linear representation format. As a result, it is possible to display in a display portion having a small number of display rows the entire mathematical expression requiring, when normally displayed, more rows in the vertical direction than display rows.

19 Claims, 7 Drawing Sheets

| | TEXTBOOK REPRESENTATION | LINEAR REPRESENTATION |
|---|---|---|
| | FRACTION | |
| FIG.5A | $\frac{1}{2}$ | 1 ⌐2 |
| | ROOT | |
| FIG.5B | $\sqrt{2}$ | √2 |
| | POWER | |
| FIG.5C | $2^3$ | 2⌢3 |
| | RADICAL ROOT | |
| FIG.5D | $\sqrt[3]{8}$ | 3 ˣ√8 |
| | INTEGRAL | |
| FIG.5E | $\int_0^1 \sin(x+\theta)\,dx$ | ∫ 0 , 1 , sin ( x + θ ) dx |
| | GROUPING SYMBOLS | |
| FIG.5F | ⎡ ⎤ | ( ) |

|  | INTERNAL STORAGE EXPRESSION | SCREEN DISPLAY |
|---|---|---|

FIG.10

(a) [ROOT] { }    √□

(b) [ROOT] {1}    √1□

(c) [ROOT] {12}    √12 □

FIG.11A $$\frac{\sqrt{3}}{2} \int_{\pi \vdash 6}^{\pi \vdash 4} \sin \frac{x}{3} \, dx$$

FIG.11B $$\frac{\sqrt{3}}{2} \int_{\frac{\pi}{6}}^{\frac{\pi}{4}} \sin \frac{x}{3} \, dx$$

DEVICE AND METHOD OF DISPLAYING MATHEMATICAL EXPRESSION FOR SMALL ELECTRONIC APPLIANCE

BACKGROUND OF THE INVENTION

1. Field of the Invention

The present invention generally relates to a display device provided in a small electronic appliance such as a multifuntion electronic calculator generally called scientific electronic calculator and a method of display, and more particularly, to a device and a method of displaying, on a display portion having only several rows for displaying numerals and symbols in the vertical direction, a mathematical expression which requires, when normally displayed, more rows than display rows of the display portion.

2. Description of the Related Art

A small electronic appliance such as a multifunction electronic calculator generally called scientific electronic calculator carrying out calculation of various mathematical expressions other than functional calculation includes a display portion narrow in the vertical direction which displays only approximately three rows of numerals and symbols. When a mathematical expression is to be entered and displayed on such a small display portion, either of the following methods is employed.

(a) A mathematical expression is entered, as ordinarily displayed, in the vertical direction irrespective of the size of a display screen. In this method, only a part of the entered mathematical expression within rows of the display screen is displayed.

(b) Input of a mathematical expression requiring more rows in the vertical direction than the display rows of the display screen is made invalid. In this method, the size of a mathematical expression which can be displayed and entered is limited only in the vertical direction.

In the above-described method of (b), since it is not possible to enter and display a mathematical expression in the vertical direction which cannot be positioned on the display screen, use of the display device is substantially limited. On the other hand, in the method of (a), when a mathematical expression requiring, when normally displayed, more rows in the vertical direction than the display rows of the display screen is entered and displayed, only a part of the mathematical expression is displayed on the display portion. Therefore, it is difficult to grasp the entire mathematical expression, and it is extremely difficult to carry out editing or the like of the mathematical expression, such as change or deletion of a numerical value of one element of the mathematical expression for correction.

In either method of (a) or (b), if a partial expression, such as a fraction, requiring a plurality of rows for display in the vertical direction exists in a mathematical expression as an independent numerical element, such as a numerator or a denominator of a fraction, or a bottom argument or a top argument of an integral, the vertical size of the entire numerical expression changes. As a result, it is necessary to carry out such complicated operations that a display position of a numerical value once entered and displayed is moved and changed in the up and down direction, an integral sign is made longer, or that grouping symbols are made larger. Furthermore, in the method of (a), it is necessary to store data indicating which part of the entire mathematical expression is displayed on the display portion. As a result, the arithmetic processing for calculating the display position of each element of the mathematical expression in the display screen becomes more complicated.

SUMMARY OF THE INVENTION

One object of the present invention is to provide a display device which can display a desired mathematical expression in a small number of display rows.

Another object of the present invention is to provide a display device which can display a mathematical expression requiring, when normally displayed, more rows in the vertical direction than display rows in a display screen in a small number of display rows, with the entire mathematical expression visually recognized.

A still another object of the present invention is to provide a display device which can omit the arithmetic processing of a display position in the vertical direction in the display device.

A further object of the present invention is to provide a method of displaying a desired mathematical expression in a small number of display rows.

The above objects of the present invention can be achieved by a mathematical expression display device including the following components. More specifically, in one aspect of the present invention, the mathematical expression display device includes an input unit entering term by term a mathematical expression requiring a plurality of display rows, a display displaying the entered mathematical expression, the mathematical expression capable of being displayed either in a first representation format or a second representation format different from the first representation format, and a unit switching between the first and the second representation formats according to a display position of the display so that the entered mathematical expression can be displayed in the display.

When the mathematical expression requiring a plurality of display rows is to be displayed, the mathematical expression is displayed in the display by switching between the first and the second representation formats. As a result, the display device is provided which can display a desired mathematical expression in a small number of display rows.

In another aspect of the present invention, a method of displaying a mathematical expression requiring a plurality of display rows in a display device having a small number of display rows includes the steps of entering the mathematical expression term by term, determining whether the entered term of the mathematical expression can be entered as it is in a textbook format according to a display position of the display device, and changing the display format when the term cannot be displayed according to the determination result.

When it is determined that the entered term cannot be displayed as it is in the textbook format according to the display position of the display device, the term is displayed by changing the display format. As a result, it is possible to provide a display method of displaying a desired mathematical expression in a small number of display rows.

Although the present ,invention has been described and illustrated in detail, it is clearly understood that the same is by way of illustration and example only and is not to be taken by way of limitation, the spirit and scope of the present invention being limited only by the terms of the appended claims.

BRIEF DESCRIPTION OF THE DRAWINGS

FIGS. 5A to 5F are diagrams showing display in the textbook format and a display in the linear format of each structure function.

FIG. 10 is an explanatory diagram showing alternately internal storage expressions and display screen in the case where a square root is displayed in the text format.

FIGS. 11A and 11B are diagrams showing in comparison a display example of a mathematical expression according to FIG. 3 and that in the case where the mathematical expression is displayed in the ordinary textbook format.

DESCRIPTION OF THE PREFERRED EMBODIMENT

Figure 1:
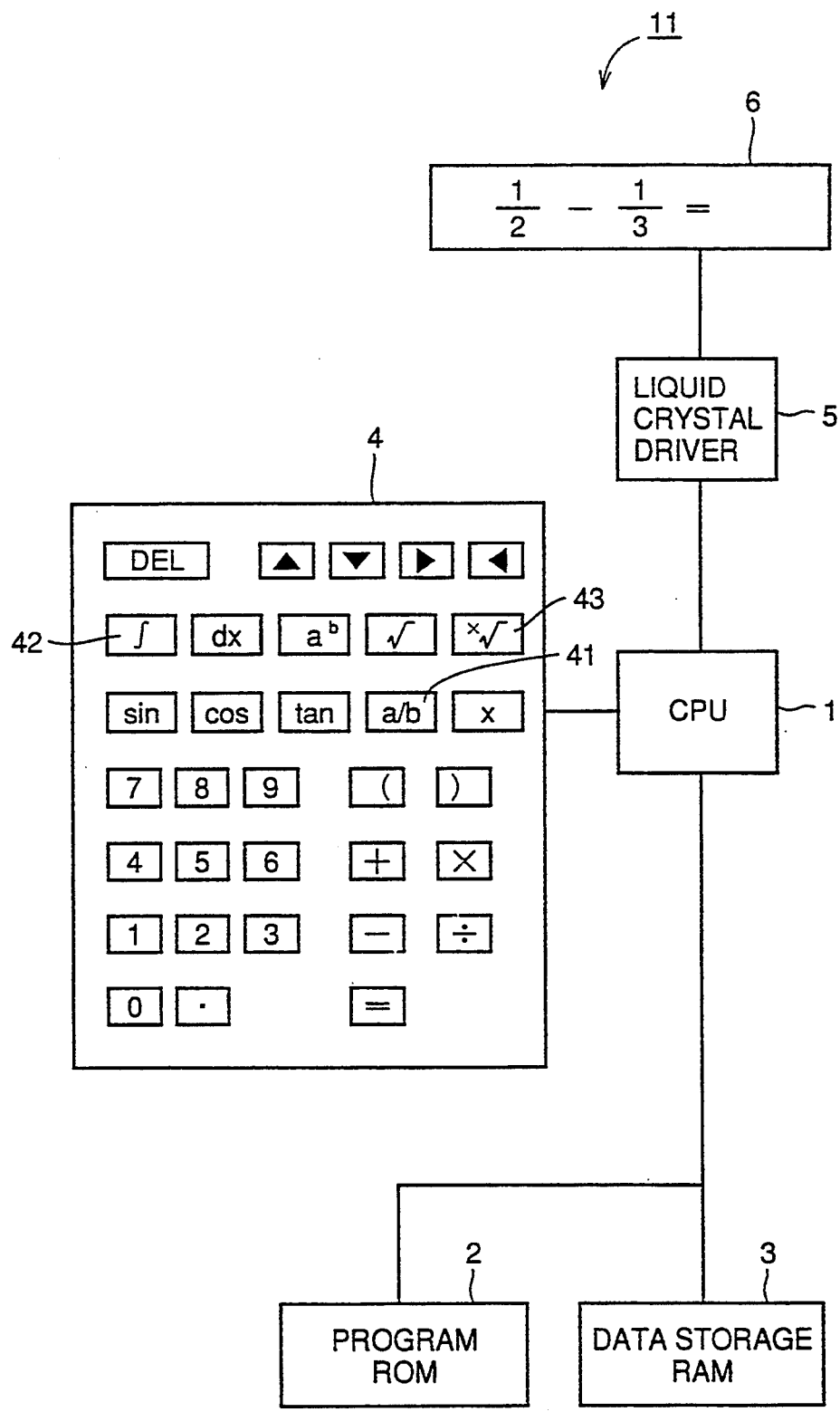
FIG. 1 is a block diagram of the main portion of a mathematical expression display device according to one embodiment of a method of the present invention.

One preferred embodiment of the present invention will be described hereinafter with reference to the drawings. Referring to FIG. 1, a mathematical expression display device 11 includes a central processing unit 1 controlling the entire system, which executes a program preset in a program ROM 2 to carry out the processing upon input of data from a keyboard 4. Data of the processing result is temporarily stored in a data storage RAM 3, and displayed on a liquid crystal display portion 6 through a liquid crystal driver 5.

Figure 4:
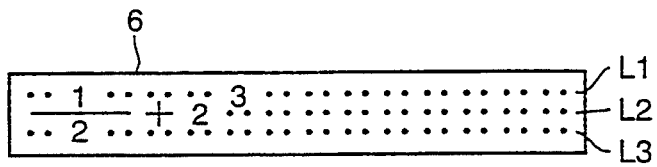
FIG. 4 is a diagram showing display rows in a display portion.

In this embodiment, liquid crystal display portion 6 has a display region for three rows as shown in FIG. 4. The liquid crystal display portion displays all elements of a mathematical expression in three rows of a center line (L2), which is regarded as a base position, an upper line (L1) and a lower line (L3). The present invention displays a function requiring, when normally displayed, a plurality of display rows, such as a fraction, a square root, an integral, a power, a radical root (hereinafter referred to as a structure function) by alternatively selecting between two kinds of representation formats of a textbook representation format representing such a function as it is as shown on the left of FIGS. 5A to 5F, and a linear representation format representing such a function in one row using individual specific symbols as shown on the right of FIGS. 5A to 5F. The selection method will be described later.

Figure 6:
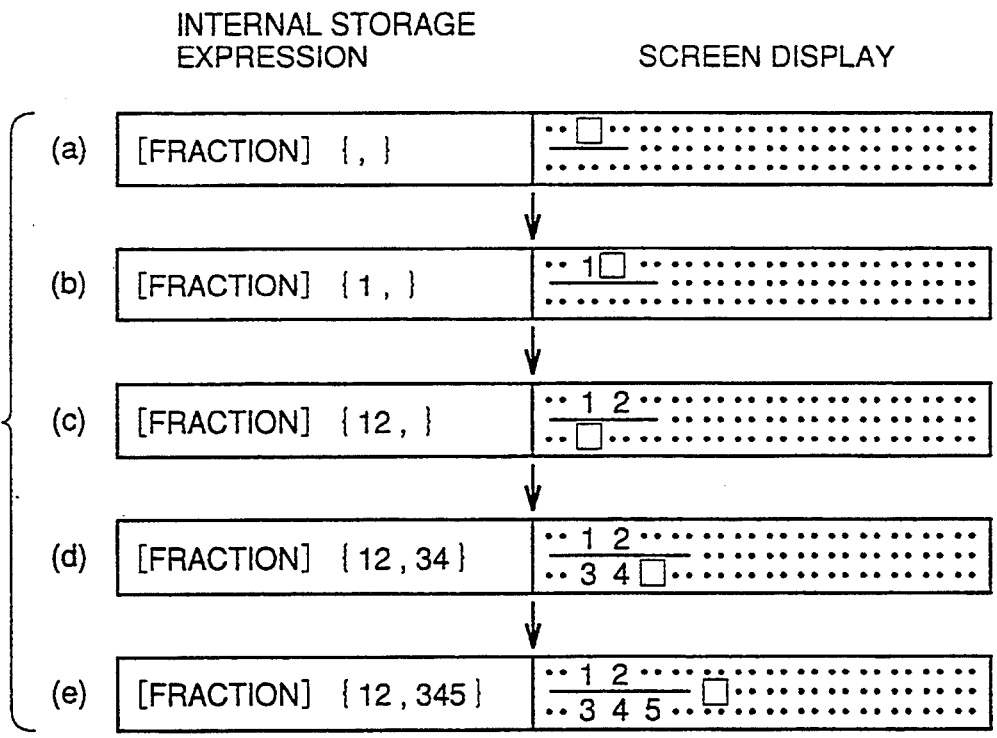
FIG. 6 is an explanatory diagram showing alternately internal storage expressions and display screens in the case where a fraction is displayed in the textbook format.

Description will now be given with reference to FIGS. 6 to 10 of the display procedures and the internal storage expressions stored in RAM 3 in the case where the above-described respective structure functions are displayed as they are in the textbook representation format. In each figure, the symbol of □ indicates the position of a cursor. First, description will be given of a fraction with reference to FIG. 6. As shown in FIG. 6 (a), upon pressing a fraction key 41, a fraction line is displayed on the center line (L2). After the cursor is moved onto the upper line (L1), a numerator is entered as shown in FIG. 6 (b). At this time, the length of the fraction line is automatically changed according to the length of a numerical value of the numerator. After the entered numerator is displayed, upon pressing a cursor right shift key or a cursor down shift key (either of which is available), the cursor moves onto the lower line (L3) as shown in FIG. 6 (c). Then, a numerical value of a denominator is displayed as shown in FIG. 6 (d). At this time, if the fraction line is shorter than the length of the numerical value of the entered denominator, the fraction line is automatically changed according to the length of the denominator. Finally, upon pressing the cursor right shift key, as shown in FIG. 6 (e), the cursor is moved onto the center line (L2) at the back of the fraction line to wait for the next entry. More specifically, when the fraction is displayed as it is in the textbook representation format, the fraction line, the numerator, and the denominator are displayed in a fixed manner on the center line (L2), the upper line (L1) and the lower line (L3), respectively. The internal storage expression at this time is stored in a format of << [fraction] (numerator, denominator) >>, as is clear from the figure.

Figure 7:
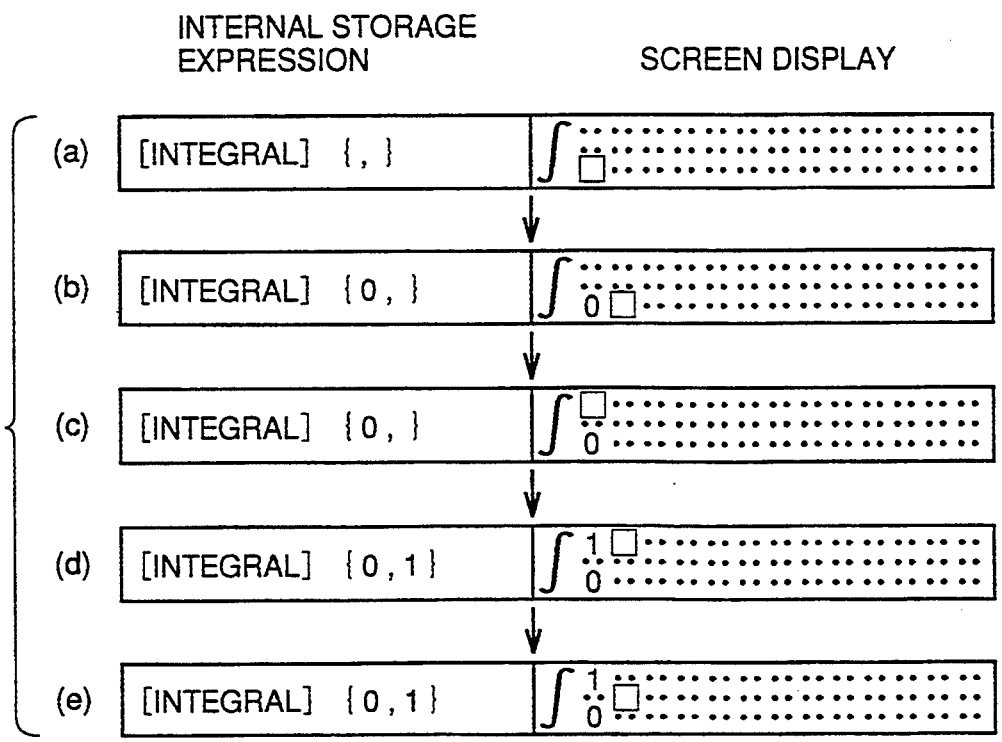
FIG. 7 is an explanatory diagram showing alternately internal storage expressions and display screens in the case where an integral expression is displayed in the textbook format.

When an integral is displayed, as shown in FIG. 7 (a), an integral sign is displayed on the center line (L2) extending over the upper and the lower lines (L1), (L3) upon pressing an integral key 42. The cursor is positioned on the lower line (L3). In this state, as shown in FIG. 7 (b), a bottom argument entered is displayed. Upon pressing the cursor right shift key or a cursor up shift key, the cursor is moved onto the upper line (L1) as shown in FIG. 7 (c). Then a top argument entered is displayed as shown in FIG. 7 (d). Finally, upon pressing the cursor right shift key, the cursor is moved onto the center line (L2) at the back of the bottom and top arguments of the integral for the next entry. More specifically, when an integral is displayed as it is in the textbook format, an integral sign is displayed on the center line (L2) extending over the upper and the lower lines (L1), (L3). Then, a bottom argument and a top argument are displayed on the lower line (L3) and the upper line (L1) in a fixed manner, respectively. The internal storage expression at this time is stored in a format of << [integral] (bottom argument, top argument) >>.

Figure 8:
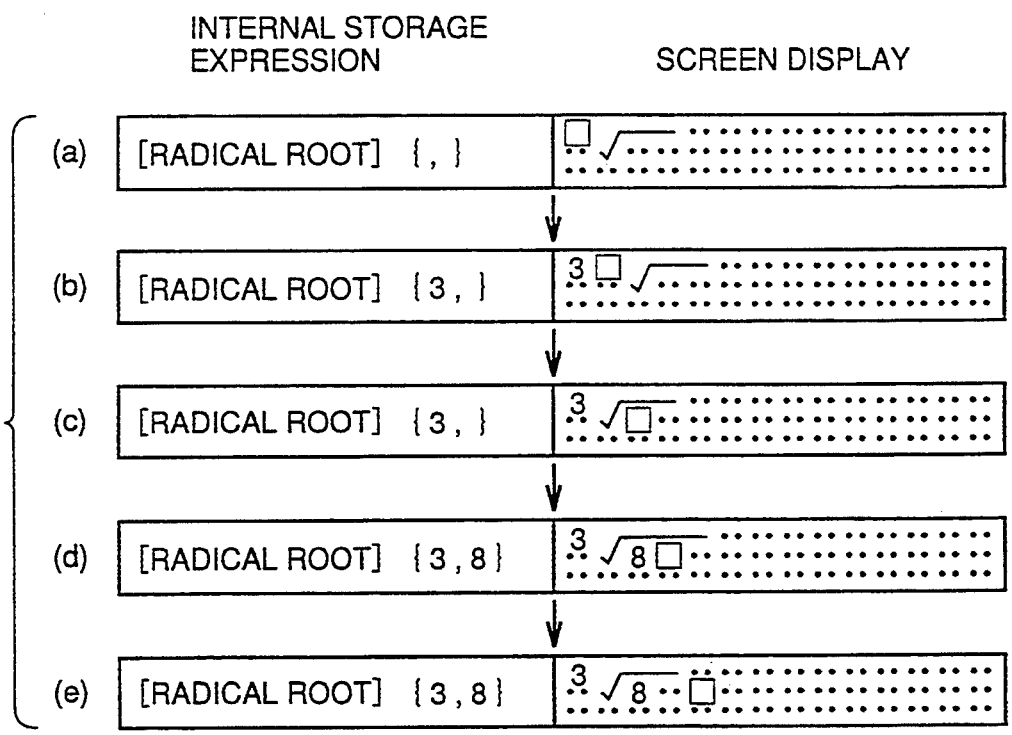
FIG. 8 is an explanatory diagram showing alternately internal storage expressions and display screens in the case where a radical root is displayed in the textbook format.

When a radical root key 43 is pressed, as shown in FIG. 8 (a), the cursor is moved onto the upper line (L1). Then, a root sign is displayed at the back of the cursor position on the center line (L2) extending over the upper line (L1). A multiplier portion entered is displayed at the cursor position, as shown in FIG. 8 (b). At this time, as is clear from FIGS. 8(a) and (b), the root sign is moved in the front and back direction according to the length of the multiplier portion. Upon pressing the cursor right shift key after the multiplier portion entered is displayed, as shown in FIG. 8 (c), the cursor is moved inside the root sign on the center line (L2). An integer portion entered is displayed as shown in FIG. 8 (d). At this time, the length of the root sign is changed according to the length of the integer portion. Finally, upon pressing the cursor right shift key, the cursor is moved onto the center line (L2) at the back of the root sign for the next entry, as shown in FIG. 8 (e). More specifically, when a radical root is displayed as it is in the textbook format, a root sign is displayed on the center line (L2) extending over the upper line (L1) and a multiplier portion and an integer portion are displayed in a fixed manner on the upper line (L1) and the center line (L2), respectively. The internal storage expression at this time is stored in a format of << [radical root] (multiplier portion, integer portion) >>.

Figure 9:
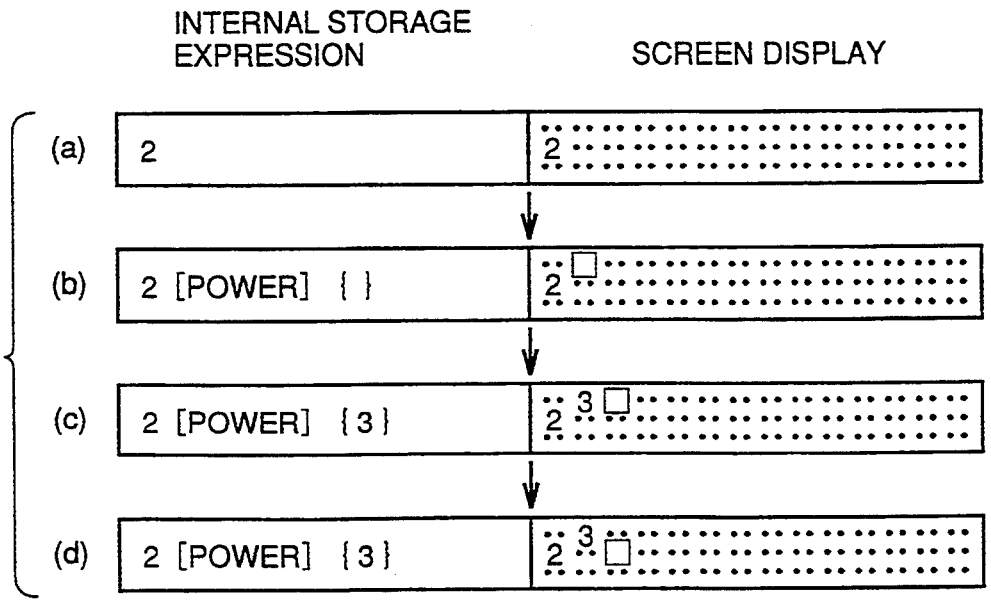
FIG. 9 is an explanatory diagram showing alternately internal storage expressions and display screens in the case where a power is displayed in the textbook format.

When a power key is pressed after the multiplier portion is displayed on the center line (L2) as shown in FIG. 9 (a), the cursor is moved onto the upper line (L1) as shown in FIG. 9 (b), and the multiplier portion entered is displayed as shown in FIG. 9 (c). After completion of display of the multiplier portion, upon pressing the cursor right shift key, the cursor is moved onto the center line (L2) for the next entry as shown in FIG. 9 (d). More specifically, when a power is displayed as it is in the textbook format, an integer portion and a multiplier portion are displayed in a fixed manner on the center line (L2) and the upper line (L1), respectively. The internal storage expression at this time is stored in a format of << [power] (multiplier portion) >>.

As to a square root, as shown in FIG. 10 (a), the root sign is displayed on the center line (L2) and the upper line (L1) upon by pressing the root key. Then, the cursor is moved onto the center line (L2) inside the root sign, and an internal expression is entered and displayed as shown in FIG. 10 (b). At this time, the length of the root sign is changed according to the length of the internal expression. Upon pressing the cursor right shift key, the cursor is moved onto the center line (L2) at the back of the root sign for the next entry as shown in FIG. 10 (c). More specifically, when a square root is displayed as it is in the textbook format, a root sign is displayed on the center line (L2) extending over the upper line (L1). An internal expression is displayed in a fixed manner on the center line (L2). The internal storage expression at this time is stored in a format of << [root] (internal expression) >>.

In either the above-described textbook representation format or the linear representation format, all the mathematical expressions are stored by internal storage expressions of one row arrangement data. Elements in the arrangement have data, such as a display position in the horizontal direction, individually. In other words, the internal storage expressions of structure functions are as shown in FIGS. 6 to 10 in the case of display in the textbook representation format. On the other hand, in the case of display in the linear representation format, as the screen display shown on the right of FIGS. 5A to 5E, a fraction, an integral, a power, a radical root and a square root are stored as one row arrangement data using signs of " $\Gamma$ ", " $\int$ ", " $\frown$ ", "x$\sqrt{\phantom{x}}$ ", and " $\sqrt{\phantom{x}}$ ", respectively. As to grouping symbols, only the size is stored. There is no particular difference between display in the textbook representation format and display in the linear representation format.

Figure 2:
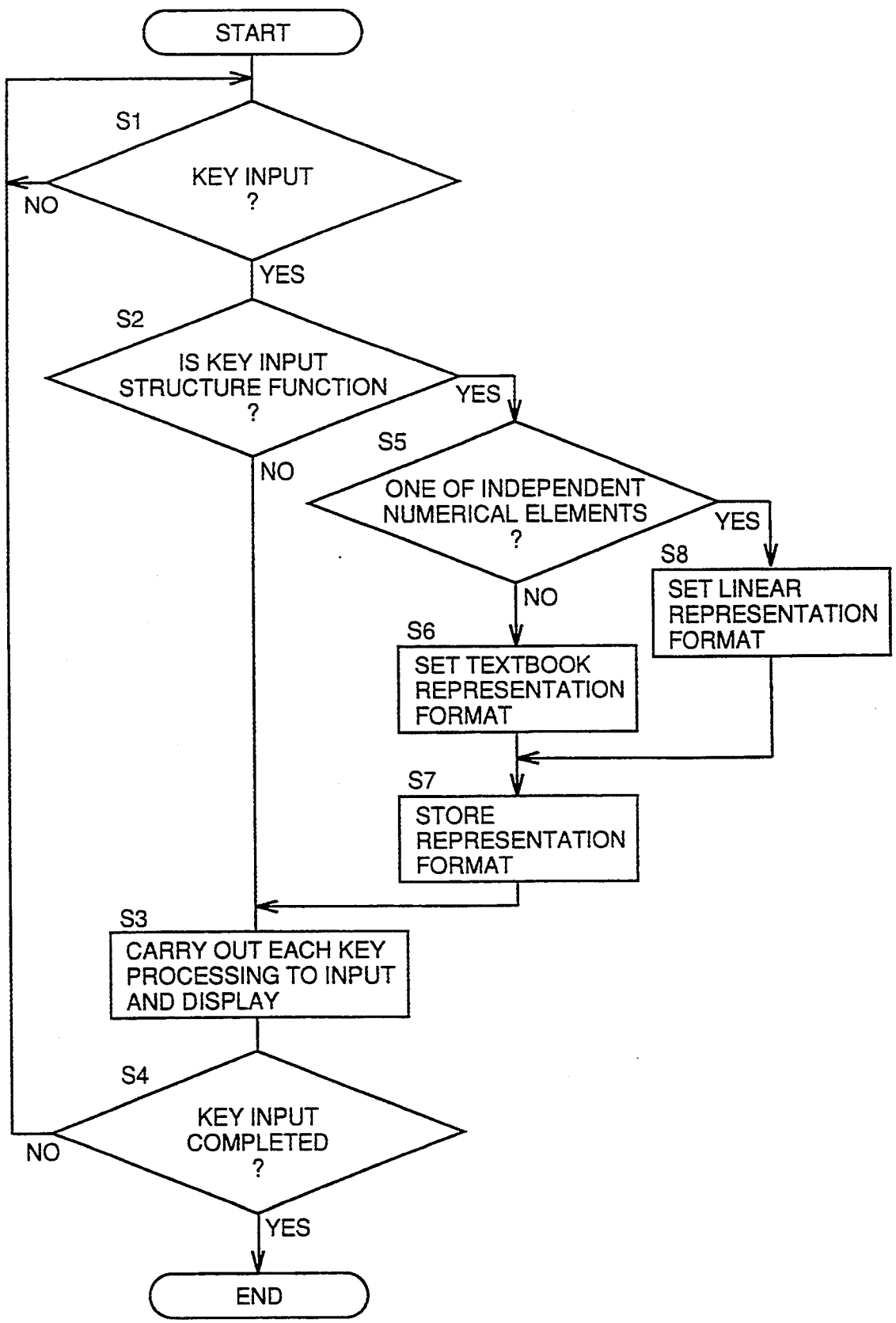
FIG. 2 is a flow chart showing the determination algorithm of selection between a textbook format in which a mathematical expression is represented as it is and a linear format in which a mathematical expression is represented in one row.

The determination processing of alternatively selecting between the textbook representation format and the linear representation format for display of a key input structure function will be described with reference to a flow chart of FIG. 2. Upon key input (step S1), it is determined whether or not the key input is a structure function represented in a plurality of rows (step S2). If it is not a structure function, the key input is processed to display the input key on display portion 6 (step S3). Then, it is determined whether or not the key input operation is completed (step S3). If it is not completed, the procedure jumps to step S1 to repeat the same processing.

When it is determined that there is a key input of a structure function, it is determined whether or not the input is one of independent numerical elements of a structure function (step S5). A denominator or a numerator of a fraction, an internal expression of a square root, a multiplier portion of a power, a multiplier portion or an integer portion of a radical root, a bottom argument or a top argument of an integral are currently set as independent numerical elements. If the input structure function is not one of independent numerical elements, the textbook representation format is set (step S6), while if the input structure function is one of independent numerical elements, the linear representation format is set (step S8). Then, after the set representation format is stored (step S7), the key processing is carried out based on the stored representation format for display of the input structure function (step S3).

Figure 3:
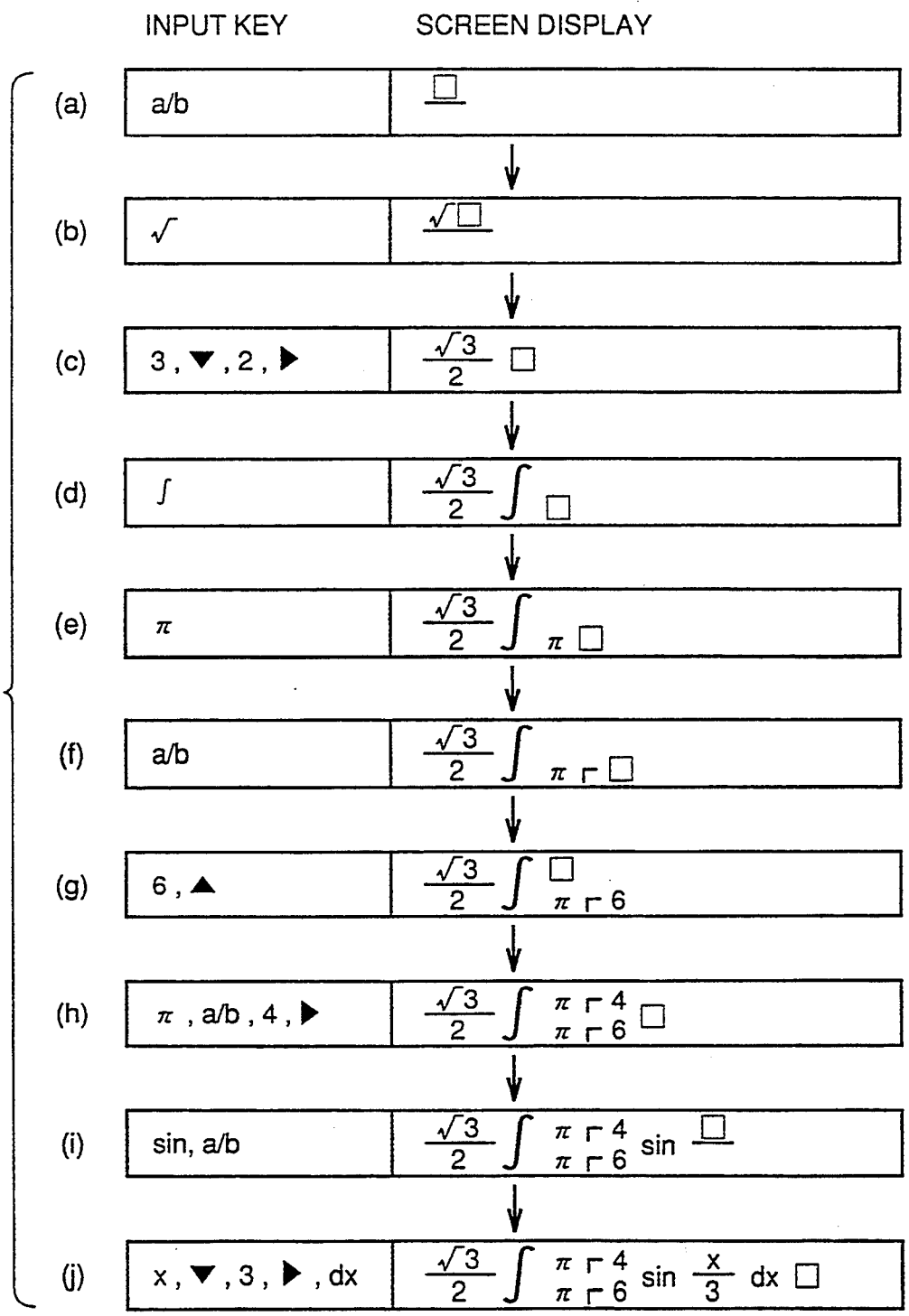
FIG. 3 is a diagram of input examples of mathematical expressions, illustrating input keys and display screens alternately.

The procedure of the flow chart of FIG. 2 will be described in detail based on an example. Description will be given of input and display of a mathematical expression in the textbook format as shown in FIG. 11B with reference to FIGS. 3 (a) to (j) showing input operation keys and screen displays on display portion 6 alternately. First, a fraction key is pressed as shown in FIG. 3 (a). Since the structure function represented by the fraction key is not one of independent numerical elements of the structure function, the textbook representation format is set, and a fraction line is displayed.

With the cursor positioned on the upper line (L1) as shown in FIG. 3 (b), a structure function is entered upon passing a root key. In this case, since the input key corresponds to a numerator of a fraction which is one of independent numerical elements of the structure function, it is determined that the entry is one of independent numerical elements, and the linear representation format is set. The root sign is displayed only on the upper line (L1), which is set in a fixed manner as a display position of the numerator portion as described above. At the same time, the cursor is moved onto the upper line (L1) at the back of the root sign. As shown in FIG. 3 (c), a number key of "3" is pressed, and a square root is displayed in the linear representation format. After that, upon pressing the cursor down shift key, the cursor is moved onto a denominator portion. Upon pressing a number key of "2", the cursor right shift key is pressed for completion of input of the fraction.

As shown in FIG. 3 (d), an integral key is pressed. Since a structure function represented by the integral key is not one of independent numerical elements, the textbook representation format is set, and an integral sign is displayed on the center line (L2) extending over the upper and the lower lines (L1), (L3). Then, as shown in FIG. 3 (e), with the cursor positioned on the lower line (L3), a key representing "$\pi$" of a numerator portion of a fraction is pressed as a bottom argument. Then, the fraction key is pressed. These keys are keys indicating a bottom argument of an integral, which is one of independent numerical elements of a structure function. Since the fraction which is a structure function needs to be displayed in the independent numerical element, the linear representation format is set. As a result, as shown in FIG. 3 (f), "⌈", is displayed. Then, as shown in FIG. 3 (g), when "6" of the denominator portion of a fraction is entered, the fraction is displayed in the linear representation format. Upon pressing the cursor up shift key after entry and display of the fraction, the cursor is moved onto the upper line (L1) which is an input position of a top argument.

As shown in FIG. 3 (h), since a structure function of the fraction entered as the top argument is one of independent numerical elements, the structure function is displayed in the linear representation format similar to the case of the above-described bottom argument. Then, upon pressing the cursor right shift key, the cursor is moved onto the center line (L2). A sine key and the fraction key are pressed as shown in FIG. 3 (i). Since the fraction entered at this time is not one of independent numerical elements, the textbook representation format is set. As shown in FIG. 3 (j), sequentially input key data is displayed in the textbook representation format.

As a result, a mathematical expression normally displayed as shown in FIG. 11B is displayed within three rows of lines (L1) to (L3) as shown in FIG. 11A. The internal storage expression at this time is < <[fraction] (√3, 2) [integral] (π ⌈ 6, π ⌈ 4) sine [fraction] (x, 3) dx > >, which is stored as one row arrangement data.

As described above, according to the method of displaying a mathematical expression of the present invention, when each structure function requiring a plurality of display rows when normally displayed is not one of independent numerical elements in another structure function, such as a denominator or a numerator of a fraction, an internal expression of a square root, a multiplier portion of a power, a multiplier portion or an integer portion of a radical root, a bottom argument or a top argument of an integral, each structure function is displayed as normally displayed in a textbook representation format with each element positioned in a fixed manner on a predetermined display row. As a result, a display position of each element of the mathematical expression in the vertical direction is fixed, whereby calculation of the display position of each element is substantially facilitated. In particular, it is not necessary to calculate the vertical size of each element.

Only when the other structure function is entered as an independent numerical element in a structure function displayed in the textbook representation format, the independent numerical element is displayed in a linear representation format. As a result, it is possible to display a mathematical expression requiring, when normally displayed, more rows in the vertical direction than display rows of a display screen in a display portion with the entire expression visually recognized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mathematical expression display device, comprising:
    input means for entering a mathematical expression requiring a plurality of display rows term by term;
    means for displaying the entered mathematical expression,
    said mathematical expression capable of being displayed in either a first representation format or a second representation format different from said first representation formation; and
    means for switching between said first and second representation formats according to a display position of said display means so that the entered mathematical expression is displayed on said display means in a hybrid representation format, the hybrid representation format being a combination of the first representation format and the second representation format.

2. The mathematical expression display device as recited in claim 1, wherein
    said switching means includes means for determining whether or not said entered mathematical expression can be entered in said first representation format on the display position of said display means, and means for switching the representation format according to a determination result of said determining means.

3. The mathematical expression display device as recited in claim 2, wherein
    said determining means determines whether or not the entered mathematical expression is a predetermined structure function.

4. The mathematical expression display device as recited in claim 3, wherein
    said determining means further determines whether or not said entered mathematical expression is an independent numerical element of said structure function.

5. The mathematical expression display device as recited in claim 2, wherein
    said first representation format is a textbook format, and said second representation format is a linear representation format representing a mathematical expression in one row by using a specified symbol.

6. The mathematical expression display device as recited in claim 5, wherein
    said display means includes a display element of three rows.

7. A device of displaying a mathematical expression for a small electronic appliance, comprising:
    display means having a first display region and a second display region;
    input means for entering a mathematical expression term by term;
    detecting means for detecting whether a display position of each term of said entered mathematical expression on the display means is in said first display region or said second display region; and
    means for switching a display method of said mathematical expression according to a detection result of said detecting means.

8. The mathematical expression display device as recited in claim 7, wherein
    said display means includes a display element of three rows, and
    said first display region is a center display region, and said second display region is a display region adjacent to said center display region.

9. The mathematical expression display device as recited in claim 8, wherein
    said display method of the mathematical expression includes a first representation format representing a mathematical expression as it is in a textbook format and a second representation format representing a mathematical expression in one row, and said first representation format is used in said first display region, and said second representation format is used in said second display region.

10. A method of displaying a mathematical expression requiring a plurality of rows in a display device having a small number of display rows, comprising the steps of:
   entering the mathematical expression term by term;
   determining whether or not the entered term of the mathematical expression can be displayed in a textbook format according to a display position of the display device; and
   changing the display method when the term cannot be displayed in the textbook format according to said determination result such that the mathematical expression is represented in a combination of textbook format and non-textbook format.

11. The method of displaying a mathematical expression as recited in claim 10, wherein
   said step of changing the display method includes the step of changing the method from a format representing said mathematical expression as it is in the textbook manner to a format representing said mathematical expression in one row.

12. A method of generating a hybrid representation format for mathematical expressions that are to be displayed, the hybrid representation format combining a first representation format and a second representation format, the method comprising:
   a) receiving a mathematical expression display request;
   b) determining if the requested mathematical expression is an independent numerical element within another mathematical expression;
   c) displaying, if the requested mathematical expression is not an independent numerical element within another mathematical expression, the mathematical expression in the first representation format; and
   d) displaying, if the mathematical expression is an independent numerical element within another mathematical expression, the mathematical expression in the second representation format;
   the hybrid representation format representing the mathematical expression in fewer rows on a display than a pure application of the first representation format.

13. A method as in claim 12, wherein:
   an independent numerical element includes one of a numerator or denominator in a fraction, an operand of a square root, a power of an exponential, a power or operand of a radical root, and a bottom argument or top argument of an integral.

14. A method as in claim 12, wherein:
   the hybrid representation format requires no more than three rows of a display.

15. The method as in claim 12, wherein:
   the first representation format is textbook representation format and the second representation format is linear representation format.

16. An apparatus for generating a hybrid representation format for mathematical expressions that are to be displayed, the hybrid representation format combining a first representation format and a second representation format, the apparatus comprising:
   input means for receiving a mathematical expression display request;
   determining means, responsive to the input means, for determining if the requested mathematical expression is an independent numerical element within another mathematical expression; and
   a display format controller, responsive to the determining means, for controlling the displayed representation format to be one of
      the first representation format if the mathematical expression is not an independent numerical element within another mathematical expression, and
      the second representation format if the mathematical expression is an independent numerical element within another mathematical expression;
   the hybrid representation format representing the mathematical expression in fewer rows on a display than a pure application of the first representation format.

17. An apparatus as in claim 16, wherein:
   an independent numerical element includes one of a numerator or denominator in a fraction, an operand of a square root, a power of an exponential, a power or operand of a radical root, and a bottom argument or top argument of an integral.

18. An apparatus as in claim 16, wherein:
   the hybrid representation format requires no more than three rows of a display.

19. An apparatus as in claim 16, wherein:
   the first representation format is textbook representation format and the second representation format is linear representation format.

* * * * *